United States Patent Office 3,539,324
Patented Nov. 10, 1970

3,539,324
APPARATUS FOR CONTINUOUSLY DRAWING A GLASS SHEET UPWARDLY WITH SENSING MEANS
Takao Terakado, Isao Kawada, and Naoyuki Kuroda, Kitakyushu, Japan, assignors to Asahi Glass Co., Ltd., Tokyo, Japan
Filed Feb. 2, 1967, Ser. No. 613,555
Claims priority, application Japan, Feb. 7, 1966, 41/6,727
Int. Cl. C03b; C03c; G01d; G08g
U.S. Cl. 65—158                                2 Claims

ABSTRACT OF THE DISCLOSURE

An electric current is introduced into a continuous glass ribbon being drawn upwardly by pairs of rolls in the drawing machine, from the contact terminals connected with the power source and positioned in contact with the ribbon. An increase in the electrical resistivity in the glass ribbon due to cracking and/or breakage produced on the ribbon is detected by an electric circuit through which said current flows. Immediately after said detection, at least a pair of rolls placed in the lower position of the drawing machine and being normally idle is activated and thereby grips the ribbon therebetween.

BACKGROUND OF THE INVENTION

Field of the invention

The present invention relates to a method of and apparatus for continuously drawing a glass sheet upwardly. More particularly, it relates to a method of and apparatus for preventing a dropping accident due to cracking and/ or breakage of the glass ribbon in an upward drawing operation of a glass sheet in a shape of continuous ribbon.

Description of the prior art

In the manufacture of sheet glass according to a vertically drawing process, such as Foulcault process, Penvernon or Pittsburgh process, a sheet of glass is vertically drawn in a shape of continuous ribbon from a bath of molten glass through the drawing chamber while being cooled. The tracting force for drawing the glass upward is supplied by way of a drawing machine provided in the annealing tower above the drawing chamber. The drawing machine includes a plurality of rolls arranged in pairs and grips the glass frictionally by these pairs of rolls and draws it upwardly from the bath. One of each pair of rolls is called "movable roll" and another is called "fixed roll." In general, the movable roll has a counterweight and is attached to movable bearings, thereby the movable roll can move toward the fixed roll and frictionally engage the glass ribbon. The fixed roll is attached to fixed bearings. The driving mechanism is connected with a pair of rolls and drives the pair of rolls at a constant velocity.

The lower pair of drawing rolls, i.e., the first one or two pairs of drawing rolls in the bottom of the drawing machine, if required, three, four or five pairs of rolls are generally idle pairs of drawing rolls, which are not engaging the glass ribbon during the drawing operation, because these rolls have a tendency to damage the freshly formed and deformable glass ribbon.

In the course of drawing operation by means of the drawing machine as described above, the glass ribbon cracks and/or breaks frequently due to any cause in the halfway of the drawing machine and drops into the bath. As main factor of this case there may be specified, for instance, variation in the temperature of molten glass, adhesion of cullet to the glass ribbon, existence of stones or foreign particles on the glass ribbon, or warp of the glass ribbon. Since the dropping of glass ribbon due to such causes interrupts the drawing operation naturally and takes a long time for reopening the operation, it gives rise to a remarkable delay of producing operation and consequently increases the cost of the product.

Similarly dropping accidents of the glass ribbon may also take place in the production of sheet glass according to other processes, e.g., Colburn process and Float process. In the production of sheet glass including the operation of drawing the glass ribbon upwardly at least in a certain area against the gravitation the dropping accident of the glass ribbon due to cracking and/or breakage of the glass ribbon may always take place.

In general, in the upward drawing operation of the glass ribbon the ribbon gives rise to cracks from its edge, namely breaks partly before the dropping of the glass ribbon. When cracking produced at the edge of the glass ribbon reaches the whole width or the almost whole width of the ribbon the glass ribbon breaks and then commences to drop.

Consequently, in order to prevent the dropping accident it is required to detect the cracking and/or breakage of the glass ribbon taking place before dropping as early as possible and to take any measures or steps before the dropping commences.

The detection of cracking and/or breakage in the course of drawing operation of the glass ribbon has hitherto been conducted upon the basis of inspection of the operator. However, it is, in fact, impossible for the operator to discover quickly all of crackings and/or breakages of the glass ribbon and in most cases it will be too late, even if it were discovered by the operator.

Consequently, it is of significance that the detection of the cracking and/or breakages taking place before the dropping of the glass ribbon is conducted by means of automatized means without relying on inspection by the operator.

SUMMARY OF THE INVENTION

In general, it is known that the glass has electric conductive property at a high temperature, e.g., temperature above 450° C. Accordingly, in the drawing operation of the glass ribbon an electric current can be passed through the predetermined longitudinal area of the glass ribbon in the range of temperature, where the glass has electric conductive property. In this case, the glass ribbon in the said area has an electrical resistivity of substantially a definite value, and it has been found that when the glass ribbon cracks and/or breaks in the said area, the electrical resistivity of the said area increases and the increase in the electrical resistivity in the said area can be detected at the outside of the glass ribbon by means of the electric current introduced into the said area. Moreover, it has also been found that the drawing operation can be continued without the glass ribbon getting into the actual situation of dropping, by taking measures or steps for preventing the actual dropping of the glass ribbon, that is, by frictionally gripping the glass ribbon between at least a pair of rolls disposed with opposing both surfaces of the glass ribbon at a position below the place where the cracking and/or breakage of the glass ribbon took place, directly after the increase in an electrical resistivity due to the cracking and/or breakage of the glass ribbon has been detected.

A principal object of the present invention is to make the continuous upward drawing operation of the glass ribbon possible by preventing the dropping of the continuous glass ribbon being upwardly drawn in the upward drawing operation of glass sheet in a shape of continuous ribbon from the bath of molten glass.

Another object of the invention is to continue the drawing operation of the glass sheet ribbon without interruption, by continuously detecting cracking and/or breakage of the glass ribbon taking place before its dropping in the operation of drawing sheet glass upwardly in a shape of continuous ribbon and preventing the dropping of the glass ribbon immediately after the direction before it happens.

A further object of the invention is to make the continuous forming operation of the sheet glass possible by automatically detecting cracking and/or breakage of the glass ribbon in the course of drawing operation taking place before its dropping in the operation of drawing the sheet glass in a shape of continuous ribbon upwardly from the molten glass bath through a drawing chamber, and preventing the dropping of the glass ribbon into a molten glass bath immediately after the detection before it happens.

Other objects and advantages of the present invention will become apparent from the following description of the invention.

According to the present invention in a method of continuously drawing a sheet glass upwardly in a shape of ribbon, various stages are provided which steps comprise introducing an electric current flowing through the predetermined longitudinal area of the glass ribbon in the course of drawing operation into the glass sheet ribbon in a temperature range sufficient for the glass to have electric conductive property, detecting an increase in an electrical resistivity of the glass ribbon appearing when the glass ribbon cracks and/or breaks in the said area by means of the said electric current and gripping the glass ribbon by at least a pair of rolls disposed with opposing both surfaces of the glass ribbon therebetween at a position below the place, where cracking and/or breakage are produced in the glass ribbon, when the increase in the said electrical resistivity exceeds the previously set value and thereby the normal continuous upward drawing operation of the glass ribbon is ensured without dropping the glass ribbon due to cracking and/or breakage produced in the glass ribbon.

The present invention also includes an apparatus for continuously drawing a glass sheet in a shape of continuous ribbon upwardly composed of active pairs of drawing rolls disposed with opposing the surfaces of the continuous ribbon and placed constantly in contact with or engaging the glass ribbon and moving the glass ribbon upwardly therebetween; at least a pair of drawing rolls disposed with opposing the surfaces of the glass ribbon below the position of the said active pairs of drawing rolls and being normaly idle; electric current introducing means for introducing an electric current flowing through the predetermined longitudinal area of the glass ribbon in a temperature range sufficiently high for the glass to have electric conductive property into the glass ribbon; detecting means for detecting an increase in the electrical resistivity of the glass ribbon appearing when the glass ribbon cracks and/or breaks in the said area by means of said electric current and an activating means for activating the said pair of normally inoperative rolls when the said increase in the electrical resistivity exceeds the previously set value, thereby gripping the glass ribbon therebetween.

BRIEF DESCRIPTION OF THE DRAWING

In order that the present invention may more readily be understood, preferred embodiments thereof are illustrated, by way of example, with reference to the accompanying drawings, in which

FIG. 3 is a diagrammatic view for illustrating a modified means for moving the movable rolls normally not engaging the glass ribbon so as to come in contact with the glass ribbon, thereby gripping the glass ribbon between the corresponding fixed rolls;

DETAILED DESCRIPTION

Figure 1:
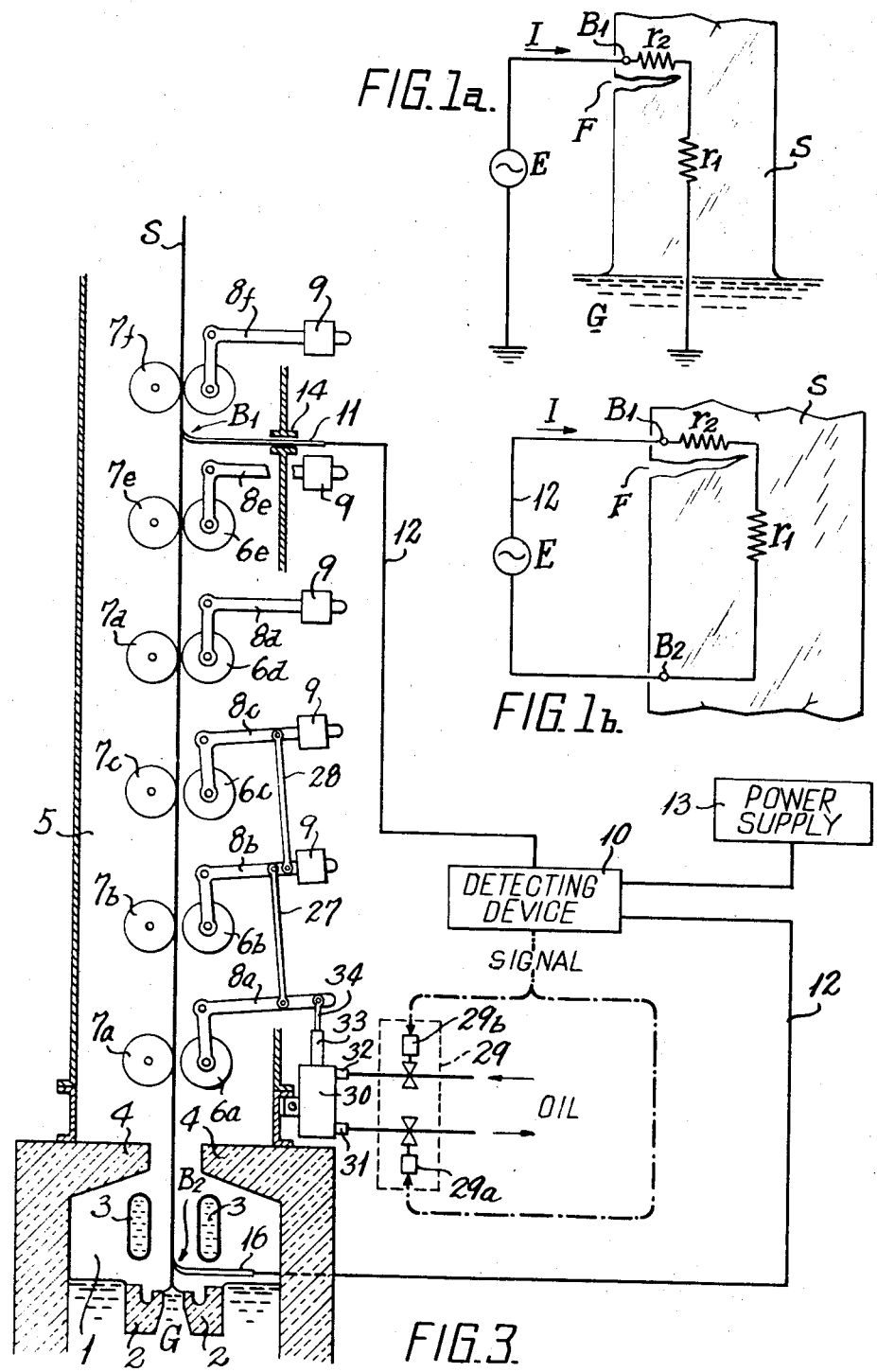
FIG. 1a is a diagrammatic view for illustrating the principle forming the basis of the invention and shows a glass sheet, which is being drawn upwardly in a shape of continuous ribbon from a molten glass bath by means of the vertically drawing method; and it explains a varying situation of the electric resistivity when cracks are produced on the ribbon in case of introducing an electric current flowing from the upper border of its predetermined longitudinal area toward the earth into the glass ribbon.
FIG. 1b is another diagrammatic view for illustrating the principle forming the basis of the invention and shows only a part of a glass sheet, which is being drawn upwardly in a shape of continuous ribbon, and it explains a varying situation of the electrical resistivity when cracks are produced on the ribbon in case of introducing an electric current flowing between the upper border and the lower border of its predetermined longitudinal area.

Referring to FIG. 1a in the drawings, a continuous glass sheet ribbons S is being drawn upwardly from a molten glass bath G. An electric current I supplied from the electric power source E is introduced from an upper contact $B_1$ positioned at the upper part of the glass ribbon S, that is, from the point, where the terminal of the conductor connecting with the electric power source E comes in contact with the glass ribbon S, into the glass ribbon and flows the predetermined longitudinal area of the glass ribbon, that is, the area the upper border of which is determined by the upper contact $B_1$ and the lower border of which is determined by the border part between molten glass bath G and glass ribbon S, and the molten glass bath G and then is grounded. On the glass ribbon S, a crack F extending laterally from one edge of the ribbon is produced below the upper contact $B_1$.

The electric current passing through the glass ribbon S will go almost vertically toward the molten glass bath, if the crack F be not produced. However, in fact, since the crack F is produced, the electric current I flows laterally from the upper contact $B_1$ along the crack F, as shown in the drawing and then flows vertically from the neighborhood of the end of the crack F. In this case, in a circuit formed by the electric current passing through the electric power source E, upper contact $B_1$, glass ribbon S, molten glass bath G and ground, the electrical resistivity of the glass ribbon S becomes the sum of electrical resistivity respectively generated in two kinds of electric current, i.e., an electric current flowing laterally and that flowing longitudinally. In general, the value of electrical resistivity, which a conductor has, will be proportional to the length of the conductor if other conditions are the same. Consequently, in the said circuit the electrical resistivity of the glass ribbon S can be replaced by two equivalent resistances $r_1$ and $r_2$. That is to say, the equivalent resistance $r_1$ indicates the electrical resistivity generated in an electric current flowing almost vertically through the neighborhood of the end of the crack F toward the molten glass bath G and has an almost definite value independent of the length of the crack F. On the other hand, the equivalent resistance $r_2$ indicates the electrical resistivity generated in an electric current flowing laterally from the upper contact $B_1$ along the crack F and has a value substantially proportional to the length of the crack F.

Let R represent the value of the electrical resistivity of the whole glass ribbon S and $l$ represents the length of the crack F. From the foregoing description, R will be expressed in the following equation:

$$R = r_1 + r_2 = r_1 + k.l \quad (I)$$

wherein $k$ is a constant determined by the operating conditions.

It will be understood that the electrical resistivity of the glass ribbon S lies in a relation of linear function with respect to the length of the crack F.

On the other hand, in regard to a voltage E impressed on the glass ribbon and E and current I, the value R of the electrical resistivity of the glass ribbon is expressed in the following equation:

$$R = r_1 + r_2 = K \cdot \frac{E}{I} \quad (II)$$

wherein K is a constant determined by the operating conditions.

The electrical resistivity of the glass ribbons can be found from the values of a voltage impressed on the glass ribbon and an electric current.

Consequently, from the above indicated Equations I and II, the length of the crack produced on the glass ribbon can be found by measuring the value of the electrical resistivity of the glass ribbon.

As can readily be understood from the above description, when an electric current is introduced into the predetermined longitudinal area of the glass ribbon, and the relation between the length of cracking of the glass ribbon and value of the electrical resistivity thereof is previously investigated, existence of crack or length of crack in the said area will be able to be detected by conversely measuring the variation or increase in the electrical resistivity of the glass ribbon in the electric circuit formed by the electric current introduced into the glass ribbon.

Referring to FIG. 1b, only a part of the continuous glass ribbon S is shown. The electric current I is supplied from the electric power source E and flows through the longitudinal area determined by the upper contact $B_1$ and lower contact $B_2$ of the glass ribbon S. The crack F extends laterally from the edge of the glass ribbon S in the said area of said glass ribbon S.

In this case, in a circuit formed by an electric current passing through the power source E, upper contact $B_1$, glass ribbon S and lower contact $B_2$, the value of electrical resistivity of the glass ribbon S is replaced by two equivalent resistances indicated by $r_1$ and $r_2$, as shown in the drawing. Also in this case, similarly to the case of FIG. 1a, existence of crack F or length of crack F can, of course, be detected by measuring variation or increase in the electrical resistivity of the glass ribbon outside the said glass ribbon using introduced electric current.

The above-mentioned facts are the main principle forming the basis to achieve various objects of the present invention, and reference is now made to embodiments in the following description.

Figure 2:
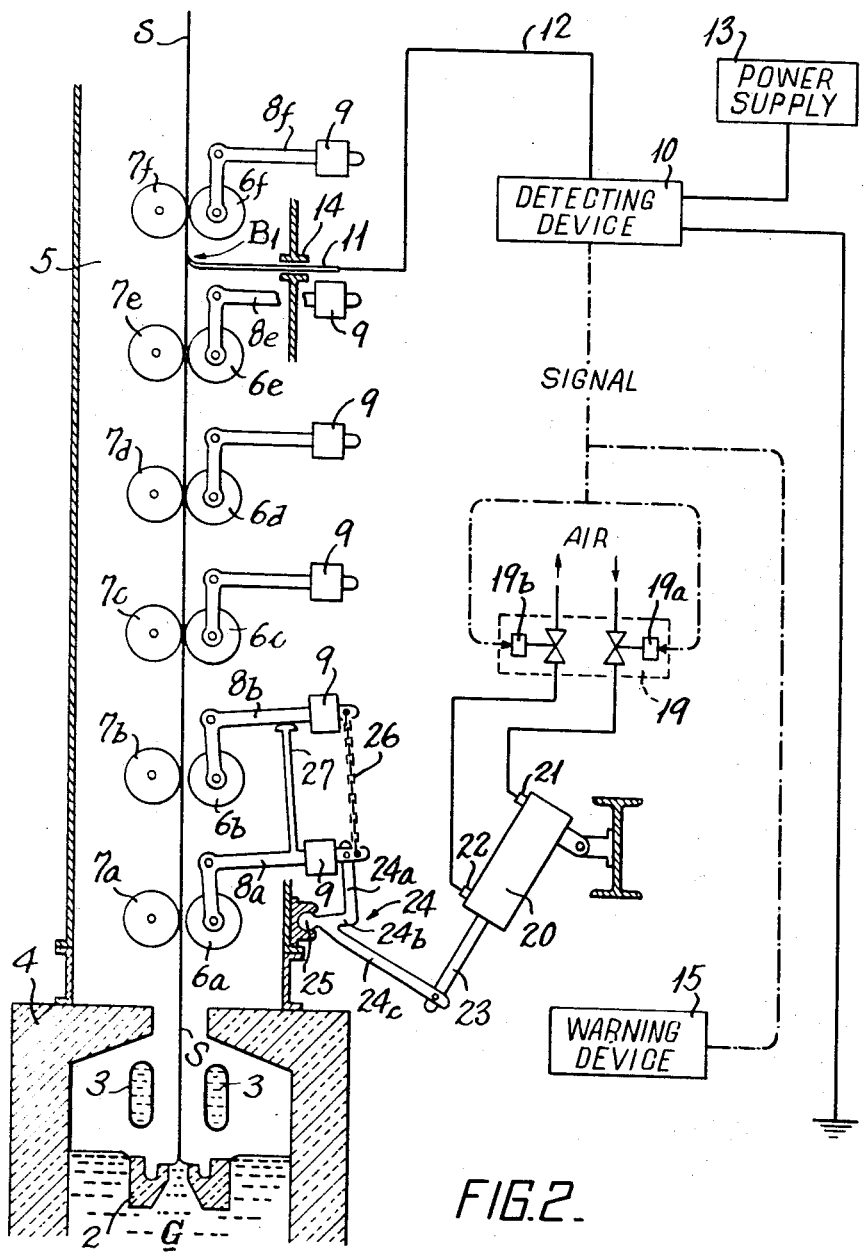
FIG. 2 is a diagrammatic view showing one embodiment of apparatus for continuously drawing sheet glass upwardly according to the invention, including an apparatus for the manufacture of sheet glass according to conventional Foulcault process.

Referring to FIG. 2, the glass ribbon S is continuously drawn vertically upward from the molten glass bath G in a drawing chamber or drawing pit 1 constituted by refractory material 4. A debiteuse 2 is sank into the molten glass bath G, and the glass ribbon S is formed into a plate-shape from the molten glass drawn through the slit of the debiteuse 2 and goes through the drawing chamber 1 while its both surfaces being cooled by the coolers 3 and then enters an annealing tower provided with a drawing machine 5. The traction force for drawing the glass ribbon is supplied by the drawing machine 5. The drawing machine 5 has a plurality of pairs of drawing rolls and each of these pairs consist of movable rolls 6a, 6b, 6c, 6d, 6e or 6f which is attached to the movable bearing and movable to come in contact or out of contact with the glass ribbon S and of fixed rolls 7a, 7b, 7c, 7d, 7e or 7f corresponding to said movable roll and attached to the fixed bearing. Counterweights 9 are respectively attached to the respective lever arms 8a, 8b, 8c, 8d, 8e and 8f of the movable rolls 6a, 6b, 6c, 6d, 6e and 6f. These movable rolls are moved toward the corresponding fixed rolls 7a, 7b, 7c, 7d, 7e and 7f, thereby come frictionally in contact with the glass ribbon S. Of these movable rolls the movable rolls 6a and 6b which are positioned below others, are held at a position not coming in contact with the glass ribbon S in the course of the normal drawing operation. Consequently, the first pair of drawing rolls 6a and 7a and the second pair of drawing rolls 6b and 7b do not take part in drawing the glass ribbon S, and are called idle or inoperative pairs of drawing rolls.

An electric current is supplied from the A.C. power source 13 through the conductor 12 and introduced from the upper contact terminal 11 coming in contact with the neighborhood of the edge of the glass ribbon S into the glass ribbon S and grounded through glass ribbon S and molten glass bath G. Consequently, a circuit is formed by the electric current flowing through the power source 13, upper contact terminal 11, glass ribbon S, molten glass bath G and ground, as shown in FIG. 1a. This circuit is provided with a detecting device 10 for detecting variation or increase in the electrical resistivity of the glass ribbon S and emitting a signal.

As the upper contact terminal 11 there may be used generally a metallic wiry material, e.g., a Nichrome wire strand or brush, and at the part of the Nichrome wire strand or brush extending through the casing of the annealing tower is provided an insulating covering 14. The upper contact terminal 11 is preferably positioned in the neighborhood of the edge of the glass ribbon S, i.e., outside the actual cutting line, because, if this terminal is positioned in the neighborhood of the central part of the glass ribbon, there is a fear of the surface of the glass being damaged and the quality of the glass sheet product being lowered. The longitudinally installed position of the upper contact terminal 11 is not particularly limited. However, it is preferred to be the highest border of the area, where there is a danger that the continuous drawing operation is interrupted due to cracking and/or breakage of the glass ribbon in the course of the drawing operation. In the manufacture of sheet glass according to the vertically drawing process as shown in the drawings, a pair of the upper contact terminals 11 are disposed at the neighborhood of the bottom of the drawing machine, e.g., at the neighborhood of both edges of the glass ribbon between a fifth pair and a ninth pair of drawing rolls from the lowest pair.

As a power source 13 an A.C. or D.C. power source may be used, but it is preferable that the A.C. power source is used and from the upper contact terminals a definite voltage, e.g., 5 to 10 volts are applied to the glass ribbon and an electric current is introduced.

In the embodiment shown in FIG. 2, the introduced electric current is grounded through the predetermined longitudinal area. In other words, said electric current flows through the power source, upper contact terminal, glass ribbon, molten glass bath and earth in that order and forms a circuit such as that of type shown in FIG. 1a. However, the electric current introduced into the glass ribbon can be flowed to outside the glass ribbon, instead of being grounded, through the lower contact terminal disposed adjacently to the glass ribbon. In other words, the electric current flows through power source, upper contact terminal, glass ribbon and lower contact terminal and forms a circuit of type shown in FIG. 1b. In this case, the lower contact terminal is disposed at the lowest border of the area, where it is subject to cracking and/or breakage of the glass ribbon, that is, at the place, where the temperature is so sufficiently high as cracking and/or breakage take place no more in the course of the drawing operation and consequently, the viscosity of the glass is low. In the manufacture of sheet glass according to the vertically drawing process, the lower contact terminal is positioned in the neighborhood of the base or meniscus of the glass ribbon in the drawing chamber 1, for example, as will be shown later in FIG. 3, or it may be dipped in the molten glass bath.

The detecting device 10 detects an increase in the electrical resistivity of the glass ribbon appearing when crack and/or breakage are produced on the glass ribbon in the course of drawing operation. Consequently, this device 10 comprises at least an electric circuit for measuring or detecting variation in the electrical resistivity of the glass ribbon. In fact, the detecting device 10 comprises not only a nelectric circuit for measuring or detecting variation in the electrical resistivity of the glass ribbon and a detecting circuit including meters, if desired but also includes a signal emitting device or circuit for emitting an electric signal in the case where an increase in the electrical resistivity exceeding the previously set value is detected by the detecting device. The signal emitting device or circuit includes, in general, a relay, e.g., meter relay, which actuates when the electrical resistivity of the glass ribbon exceeds the previously set value.

The signal emitted from the detecting device 10 is transmitted to an operating device including an electromagnetic valve 19 and air cylinder 20 and to a warning device 15 and operates these devices. The operating device effects an operation for preventing the actual dropping of the glass ribbon by way of an automatic mechanism. The warning device, for example, an electric bell, siren or light signal, gives alarm to the operator and enables him to perform the operation for preventing the glass ribbon from actual dropping.

The value of the electrical resistivity of the glass ribbon to be measured when a glass ribbon of a definite thickness is normally drawn can depend upon the distance between upper contact terminal and the molten glass bath or lower contact terminal, the contact position in lateral and longitudinal directions of contact terminals to the glass ribbon and other conditions, but indicates an almost constant value under a given situation. As shown in FIG. 2, in the case where an electric current which flows from the upper contact $B_1$ positioned on the edge of the glass ribbon in the neighborhood of the fifth drawing rolls through the glass ribbon S and molten glass bath G, and is earthed, is introduced into the glass ribbon S, the value of electrical resistivity of the glass ribbon is about 40 k$\Omega$, for example, in the operation of drawing a glass sheet having a thickness of about 5 mm., and the variation in this value lies within 10% in the course of the normal drawing operation. In this case, the value of the electrical resistivity is about 85 k$\Omega$ at the time when a crack extending laterally from one edge and having a length of 50 cm. is produced on the glass ribbon S, and the value is about 125 k$\Omega$ at the time when a crack 100 cm. long is produced and an almost linear functional relation is observed between the length of the crack and the value of the electrical resistivity. Consequently, as a previously set value, for example, the value at the time when a crack 50 cm. long is produced on the said glass ribbon S is given to the detecting device 10 and the detecting device 10 is so adjusted that the detecting device 10 emits a signal when an increase in the electrical resistivity exceeding this value is detected. Thus, at the time point when the crack extends to a predetermined length, the danger of dropping is sensed and a rapid operation for preventing the actual dropping can be performed.

In the present invention, the operation to prevent the actual dropping of the glass ribbon means an operation to activate at least a pair of drawing rolls, which are positioned in the lower border of the area where crack and/or breakage of the glass ribbon are subject to be produced and normally idle, and to grip the glass ribbon therebetween.

In the embodiment shown in FIG. 2, the above-mentioned operation is carried out by means of an automatic mechanism. An automatic mechanism for activating the lowest pairs of drawing rolls in the drawing machine, which are normally idle, i.e., the first pair and second pair of drawing rolls and for gripping the glass ribbon S therebetween will be illustrated in the following.

The lever arm 8a connected with the movable roll 6a of the first pair of the drawing rolls is connected with the piston rod 23 of an air cylinder 20 through the lever 24. The lever of polygonal line 24 is constituted by an element 24a connected with the lever 8a at right angle, an element 24b connected with the element 24a at right angle and an element 24c connected with the piston rod 23 of the air cylinder 20 at right angle. A pivot 25 between the elements 24b and 24c is attached to the casing of the drawing machine 5. The lever 24 may be rotated around the pivot 25 as center, while the lever arm 8b connected with the movable roll 6b of the second pair of the drawing rolls is connected with the movable roll 8a through a chain 26 and rests on a spacing rod 27. Consequently, the movable roll 6b is moved in quite the same manner as the movable roll 6a.

The reciprocating motion of the piston rod 23 of the air cylinder 20 is carried out by sending air to or exhausting air from the piping mouth 21 located at the rear end of the cylinder 20 and the piping mouth 22 located at the front end of the cylinder. This motion is carried out correspondingly to the operation of the electromagnetic valve 19 which has two solenoids 19a and 19b and controlled by an electric signal, and is operative in response to the signal emitted from the detecting device 10.

In the apparatus for continuously drawing the glass ribbon constructed as explained above, let it be assumed that while the glass ribbon S is being drawn from the molten glass bath G vertically upward, a crack is produced on the glass ribbon. If the crack commences to be produced from an edge of the glass ribbon S, the electrical resistivity of the glass ribbon will be increased correspondingly, and when this electrical resistivity exceeds the previously set value, a signal is transmitted from the detecting device 10 to the electromagnetic valve 19. Thus, the solenoids of the electromagnetic valve 19 are actuated, and air is sent from the piping mouth 21 of the air cylinder 20, while at the same time, the air in the air cylinder 20 is exhausted from the piping mouth 22 and thereby the piston rod 23 of the air cylinder 20 is pushed out downwardly. Consequently, the lever 24 connected with this rod rotates clockwise around the pivot 25 as center, and in conjunction therewith the lever arm 8a connected with the movable roll 6a and the lever arm 8b of the movable roll 6b connected with this arm make rotation downward and finally the movable rolls 6a and 6b are moved toward the glass ribbon S. Thus, the movable rolls 6a and 6b normally not coming in contact with the glass ribbon grip the glass ribbon S firmly between themselves 6a and 6b and the corresponding fixed rolls 7a and 7b and drive this glass ribbon upwardly while rotating. Consequently, even if the crack produced on the glass ribbon extend to the whole width of the ribbon, the glass ribbon S would be gripped at a place below the position, where crack and/or breakage are produced, by pairs of drawing rolls, and therefore the drawing operation will be able to be continued without interruption.

Referring to FIG. 3, the electric current supplied from the electric power source 13 is introduced from the upper contact terminal 11 into the glass ribbon S and then flows outside the glass ribbon from the lower contact terminal 16 coming in contact with the neighborhood of the meniscus of the glass ribbon in the drawing chamber 1. In this case, the electric current flows through the power source 13, upper contact terminal 11, glass ribbon S and lower contact terminal 16 and forms a circuit of type shown in FIG. 1b.

In the present embodiment, the first pair of drawing rolls 6a and 7a, the second pair of drawing rolls 6b and 7b and the third pair of drawing rolls 6c and 7c at the bottom of the drawing machine 5 are kept in a situation, where they do not grip the glass ribbon and are idle, in the course of normal drawing operation. The lever arm 8a of the movable roll 6a is connected with a piston rod 33 of an oil cylinder 30 through a connecting rod 34. The oil cylinder 30 is so secured to the casing of the drawing machine 5 as to cause its piston rod 33 to reciprocate vertically. The backward motion of the piston rod 33 is carried out by sending oil from the piping mouth 32 located at the front end of the cylinder and exhausting oil from the piping mouth 31 located at the rear end of the cylinder. This motion is carried out correspondingly to the operation of the electromagnetic valve 29, which has two solenoids 29a and 29b and controlled by an electric signal from the detecting device 10 is operative in response to the signal from the detecting device. The lever arm 8a of the movable roll 6a and the lever arm 8b of the movable roll 6b are connected with each other through a connecting rod 27, and the lever arm 8b of the movable roll 6b and the lever arm 8c of the movable roll 6c are connected with each other through a connecting rod 28 and the movable rolls 6b and 6c are moved in the same manner as the movable roll 6a.

The order of detection and operation is almost similar to that of the embodiment in FIG. 2 and as described below:

In the case where a crack has been produced on the glass ribbon in the area between the upper contact terminal 11 and the lower contact terminal 16, when the increase in the electrical resistivity of the glass ribbon S due to cracking exceeds the previously set value, the detecting device detects this and emits an electric signal to the electromagnetic valve 29. Oil is sent from the piping mouth 32 and at the same time it is discharged from the piping mouth 31 and the piston rod 33 descends. The lever arms 8a, 8b and 8c connected with this rod rotate downward at the same time and consequently, the movable rolls 6a, 6b and 6c move toward the glass ribbon S and grip the glass ribbon S firmly between them 6a, 6b and 6c and respectively corresponding fixed rolls 7a, 7b and 7c and draw this upward.

Figure 4:
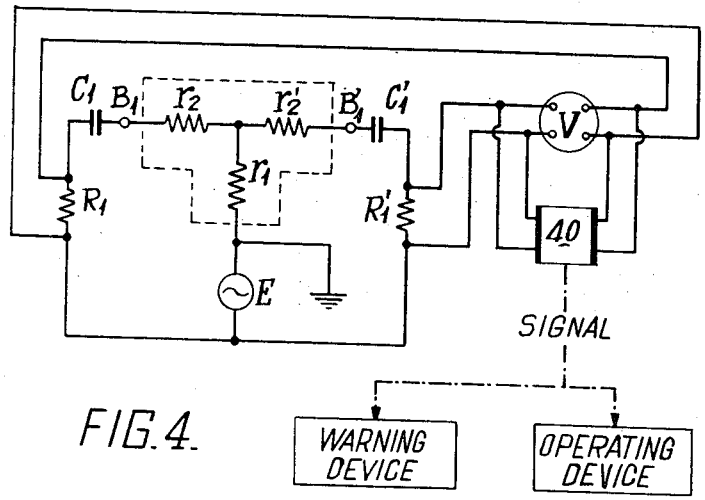
FIG. 4 shows an example of a diagram of an electric circuit incorporated in the detecting means for detecting cracking and/or breakage of the glass ribbon in the course of drawing operation in the invention and FIG. 5 shows an example of a diagram of an electric circuit used for detecting means, operating means and warning device shown in FIG. 2.

FIG. 4 shows a simple example of the diagram of an electric circuit for measuring and detecting the increase in the electrical resistivity of the glass ribbon due to cracking and/or breakage of the glass ribbon in the course of drawing operation.

Referring to FIG. 4, reference characters $r_1$, $r_2$ and $r_2'$ are respectively equivalent resistances indicating the electrical resistivity of the glass ribbon and $r_2$ and $r_2'$ show respectively electrical resistivity produced in electric currents flowing laterally along cracks extending from right and left edges of the glass ribbon and the values of these resistances are substantially proportional to the lengths of the cracks. On the other hand, $r_1$ indicates the electrical resistivity produced in the electric current flowing longitudinally through the glass ribbon and the value is independent of the lengths of cracks and has an almost definite value. The part enclosed by dotted line shows the equivalent circuit wherein glass ribbon and molten glass are designated as an electric circuit. E shows an A.C. power source for introducing an electric current into the glass ribbon. $B_1$ and $B_1'$ show contact points of a pair of upper contact terminals placed in contact with the glass ribbon in the neighborhood of right and left edges of the glass ribbon with the glass ribbon. $R_1$ and $R_1'$ show fixed resistances. $C_1$ and $C_1'$ show condensers for preventing a direct current due to the electromotive force between molten glass and refractory material from flowing in the circuit. A voltmeter V is provided in the circuit by connecting its terminals with both ends of the fixed resistances $R_1$ and $R_1'$ and this voltmeter V measures and indicates the value of voltage drop in $R_1$ and $R_1'$ in addition. A voltage relay 40 is arranged in parallel with the voltmeter V. The voltage relay 40 operates when the value of voltage drop reaches the previously set value in the fixed resistances $R_1$ and $R_1'$ and emits a signal to the operating device and the warning device.

Since when the glass ribbon has normally been drawn, the resistance values of the equivalent resistances $r_2$ and $r_2'$ are zero, an electric current of a definite value flows in the circuit and moreover, the voltage drop in the fixed resistances $R_1$ and $R_1'$ is also constant. Let it be assumed that a crack is produced from right edge or left edge of the glass ribbon. The value of $r_2$ or $r_2'$ will be increased almost in proportion to the length of the crack so that an electric current flowing through the circuit is decreased. Consequently, the value of voltage drop in the fixed resistance $R_1$ or $R_1'$ is decreased. The voltmeter V indicates and detects this decrease in the value of voltage drop. In other words, the voltmeter V detects the increase in the electrical resistivity of the glass ribbon with the variation in the voltage drop in the fixed resistances $R_1$ and $R_1'$ as a parameter and consequently, detects the cracking on the glass ribbon.

In fact, when the increase in the electrical resistivity of the glass ribbon exceeds the previously set value with cracking on the glass ribbon, the voltage relay 40 operates and can emit a signal to operating device and warning device, as described above, because the value of the voltage drop applied to the voltage relay 40 is equal to the value applied to the voltmeter V. If the relation between the increase in the electrical resistivity of the glass ribbon due to cracking on the glass ribbon and the value of the voltage drop measured by the voltmeter V is previously investigated and on the basis thereof, a suitable value of voltage be set for the voltage relay 40, a signal will automatically be emitted when the voltage drop reaches this previously set value.

Operator's attention is evoked by the operation of the warning device thereby he carries out an operation for preventing the actual dropping of the glass ribbon, or else an operating device comprising an automatic mechanism for activating normally idle pairs of drawing rolls as shown in FIGS. 2 and 3 actuates to prevent the glass ribbon from actual dropping.

Figure 5:
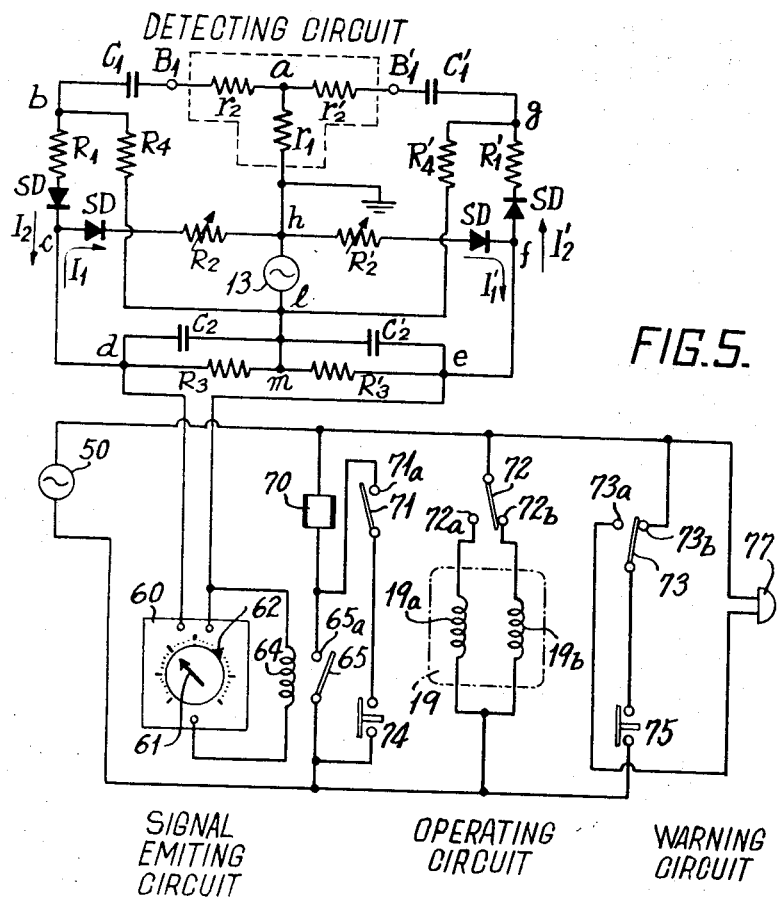

FIG. 5 shows an electric circuit including a detecting circuit for measuring or detecting the increase in the electrical resistivity of the glass ribbon due to cracking and/or breakage of the glass ribbon in the course of drawing operation; an operating circuit used for activating pairs of drawing rolls, which are normally idle, in order to prevent the glass ribbon from actual dropping in response to the signal; and a warning circuit used for emitting an alarm in response to the signal. This electric circuit is used in detecting device, operating device and warning device in FIG. 2.

Referring to FIG. 5, reference characters $r_1$, $r_2$, $r_2'$, $B_1$, $B_1'$, $C_1$ and $C_1'$ are used in the same meaning as those in FIG. 4. Reference characters $R_1$, $R_1'$, $R_3$, $R_3'$, $R_4$ and $R_4'$ show fixed resistances, and $R_2$ and $R_2'$ show variable resistances. Reference character SD shows a rectifier for determining the direction of electric current. Reference characters $C_2$ and $C_2'$ show condensers for making the electric current smooth. The detecting circuit is formed by the above-mentioned elements and A.C. power source 13.

In the left half of the present circuit the measuring current $I_2$ flowing from A.C. power source 13 through connected wire points $h$, $a$, $b$, $c$, $d$, $m$ and $l$ will be given by the following equation, if the voltage of A.C. power source 13 be E as illustrated in FIG. 1a:

$$I_2 = \frac{E}{r_1 + r_2} \cdot K$$

wherein K is a constant determined by operating conditions.

That is, $I_2$ is proportional to the recipocal number of the electrical resistivity of the glass ribbon $r_1 + r_2$. On the other hand, a stationary current $I_1$ flowing from A.C.

power source 13 through the connected wire points $l$, $m$, $d$, $c$ and $h$ has a definite value determined by the resistance value of the variable resistance $R_2$ and flows through the fixed resistance $R_3$ in the opposite direction to the measuring current $I_2$. That is, in the fixed reisstance $R_3$ flows the resultant current $I_1+I_2$ of these currents.

Also in the right half of the present circuit, the measuring current $I_2'$ flowing from the A.C. power source 13 through the connected wire points $l$, $m$, $e$, $f$, $g$ and $a$ is similarly given by the following equation:

$$I_2' = \frac{E}{r_1+r_2'} \cdot K'$$

wherein $K'$ is a constant determined by operating conditions.

The stationary current $I_1'$ flowing from the A.C. power source 13 through the connected wire points $h$, $f$, $e$, $m$ and $l$ has a definite value determined by the resistance value of the variable resistance $R_2'$ and flows through the fixed resistance $R_3'$ in the direction opposite to the measuring current $I_2'$. That is, in the fixed resistance $R_3'$ flows the resultant current of these currents $I_1'+I_2'$.

Reference numeral 60 shows a meter relay. The input terminal of the meter relay is connected with the connected wire points $d$ and $e$. The pointer 61 of the meter relay 60 indicates consequently the resultant value $[R_3(I_1+I_2)+R_3'(I_1'+I_2')]$ of the voltage drops in the fixed resistances $R_3$ and $R_3'$.

When the glass ribbon is being normally drawn, the measuring currents $I_2$ and $I_2'$ are not varied. Since the stationary currents $I_1$ and $I_1'$ flow respectively through the fixed resistances $R_3$ and $R_3'$ in the directions opposite to the corresponding measuring currents $I_2$ and $I_2'$, absolute values of $I_1$ and $I_2$ can respectively be made equal to those of $I_1'$ and $I_2'$ by adjusting the resistance values of variable resistances $R_2$ and $R_2'$. That is, the resultant current $I_1+I_2$ in $R_3$ and the resultant current $I_1'+I_2'$ in $R_3'$ can be set to 0 (zero value) by the mutual negation between the stationary current and the measuring current. If this be done, the value of voltage drop indicated by the pointer 61 of the meter relay 60 will be able to be set to 0.

When cracks are produced on left or right side or on both sides of the glass ribbon and the equivalent resistances $r_2$ and/or $r_2'$ are increased, the measuring currents $I_2$ and/or $I_2'$ are decreased in inverse proportion to the equivalent resistance. Consequently, the values of resultant currents flowing through the fixed resistances $R_3$ and/or $R_3'$ are remarkably increased from 0 almost in a manner of reciprocal function and the pointer 61 indicates a remarkable increase in the value of voltage drop.

Since this detecting circuit has characteristics as described above, it can detect crackings of the glass ribbon with high sensitivity even in the early stage of cracking.

This detecting circuit is connected with a signal-emitting part for emitting a ignal to the operating circuit and warning circuit. A setting knob 62 movable along the indicating scale of the meter relay 60 is provided and this knob 62 can be positioned at an arbitrary point on the scale, i.e., at a previously set value. When the pointer 61 reaches the point on the scale, where the setting knob 62 is positioned, the solenoid coil 64 operates to cause the switch 65 to come in contact with the contact 65a. Thus, an electric current will flow from the operating A.C. power source 50 to the relay 70 and the relay 70 will operate. The relay 70 sucks the switch 71 so as to cause said switch to come in contact with the contact 71a, while at the same time, changes-over the switch 72 from the contact 72b to the contact 72a and the switch 73 from the contact 73b to the contact 73a. Consequently, the solenoid coil of the electromagnetic valve 19 and the electric bell 77 operate. The electromagnetic valve 10 comprises a solenoid coil 19a for moving forward the piston rod of the air cylinder and a solenoid coil 19b for retracting the piston rod, as shown in FIG. 2. Since the switch comes normally in contact with the contact 72b, the solenoid coil 19b is in operation and as shown in FIG. 2, the piston rod of the air cylinder has been retracted. When the relay 70 operates and the switch 72 is change-over to the contact 72a, the solenoid coil 19a operates, therefore the piston rod is moved forward and thus, the first pair of drawing rolls and the second pair of drawing rolls, which normally idle, are activated to grip the glass ribbon therebetween and to drive the glass ribbon while rotating. The electric bell 77 alarms the operator the danger of dropping of the glass ribbon by its operation, but, if becomes unnecessary, this will be able to be stopped by pushing the hand operating switch 75. The hand operating switch is also pushed in order to return the electromagnetic valve 19 to its initial situation.

In the detecting circuit shown in FIGS. 4 and 5, the terminal showing the points to be earthed can be regarded as the contact point of the lower contact terminal used in the embodiment shown in FIGS. 1b and 3 and the glass ribbon. Consequently, it is apparent that these circuits can similarly be applied also to the case of introducing electric current flowing through the upper and lower borders of the predetermined longitudinal area into the glass ribbon from the upper contact terminal and lower contact terminal.

We claim:

1. In an apparatus for continuously drawing a sheet glass as a continuous glass ribbon from a pool of molten glass comprising active pairs of drawing roll means positioned on opposing surfaces of the continuous glass ribbon and placed constantly in contact with the glass ribbon for moving the glass ribbon upwardly therebetween, and at least a pair of similar drawing roll means positioned below said active pairs of drawing rolls and being normally idle, one roll of said pair having a lever arm for moving it into glass contacting position, the improvement comprising electric current means for introducing an electric current into the glass ribbon flowing through a predetermined longitudinal area of the glass ribbon during the drawing operation, said area of the glass ribbon extending from the region of the pool of molten glass to the region of the active pairs of drawing rolls and being in a temperature range above about 450° C. and sufficiently high for the glass to be electrically conductive, said electric current introducing means including an electric power source of a constant voltage, at least one contact terminal in contact with the surface of the glass ribbon, and at least one conductor connecting said contact terminal with said electric power source; the resistivity of said area of the glass ribbon increasing upon the occurrence of a discontinuity, detecting means for detecting the increase in the electrical resistivity of the glass ribbon appearing when a discontinuity is produced in the glass ribbon in the said area, said detecting means including an electric circuit in which said electric current introduced into the glass ribbon flows and which detects the increase in the electrical resistivity of the glass ribbon; signal-emitting means operatively connected to said detecting means for emitting a signal when the said increase in the electrical resistivity exceeds a previously set value, said value being a value greater than the variation in the electrical resistivity appearing in the course of normal drawing operation, said signal-emitting means including a relay which operates when the increase in the electrical resistivity of the glass ribbon exceeds said previously set value; and activating means for activating the said normally idle pair of drawing roll means in response to the said signal and thereby gripping the glass ribbon therebetween, said activating means comprising a cylinder, a reciprocating piston in said cylinder connected to said lever arm of the movable roll of the said normally idle pair of drawing rolls to lower the said lever arm so as to cause said pair of rolls to grip the glass ribbon between them, and an electromagnetically operated valve for controlling the flow of fluid into the cylinder, said valve operating in response to operation of said relay to admit fluid into said cylinder to move the piston and the connected lever arm to cause the normally idle pair of rolls to grip the ribbon.

2. An apparatus as claimed in claim 1, said detecting means comprising an electric circuit in which the electric current introduced into the glass ribbon flows, provided with at least a fixed resistance, and said signal-emitting means comprising a meter relay provided with the input terminals connected with both ends of said fixed resistance, a scale and a pointer indicating the voltage drops in said fixed resistance and a setting knob positioned at a point on the scale corresponding to the previously set value of the increase in the electrical resistivity of the glass ribbon, said meter relay activating the electromagnetically operated valve of the fluid cylinder when said pointer exceeds the point of said setting knob by an increase in the electrical resistivity of the glass ribbon when a discontinuity occurs in the glass ribbon.

References Cited

UNITED STATES PATENTS

| 1,514,338 | 11/1924 | Redshaw | 65—163 |
| 2,645,749 | 7/1953 | Labino et al. | 65—158 XR |
| 2,932,921 | 4/1960 | Augsburger | 65—158 |
| 2,972,210 | 2/1961 | Broman et al. | 65—158 XR |
| 3,188,192 | 6/1965 | Parubeck et al. | 65—163 |
| 3,290,179 | 12/1966 | Goulding | 65—29 XR |
| 3,419,374 | 12/1968 | Offenbacher et al. | 65—163 XR |

FOREIGN PATENTS 1,765,590  9/1961  Sweden.

FRANK W. MIGA, Primary Examiner

U.S. Cl. X.R.

65—28, 29, 91, 160; 163, 176, 199, 20